E. A. HORNBOSTEL & E. CARROLL.
FAUCET.

No. 172,317. Patented Jan. 18, 1876.

Witnesses:
Geo. A. Aird
Hugh Aird

Inventors:
E. A. Hornbostel
Edward Carroll
per D. O. Ridout & Co.
Attys

UNITED STATES PATENT OFFICE.

ERNST A. HORNBOSTEL AND EDWARD CARROLL, OF GUELPH, CANADA.

IMPROVEMENT IN FAUCETS.

Specification forming part of Letters Patent No. 172,317, dated January 18, 1876; application filed April 20, 1875.

*To all whom it may concern:*

Be it known that we, ERNST ALOYS HORNBOSTEL and EDWARD CARROLL, both of the town of Guelph, in the county of Wellington, Province of Ontario, Canada, have invented certain new and useful Improvements in Wooden Beer and Liquor Taps, of which the following is a specification:

The application and uses of our invention will first be described, and its nature afterward pointed out in the claim of invention at the end hereof.

Figure 1:
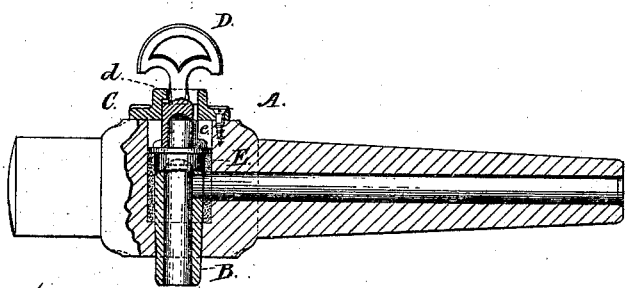
Figure 2:
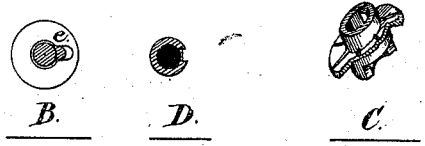
Figure 2:
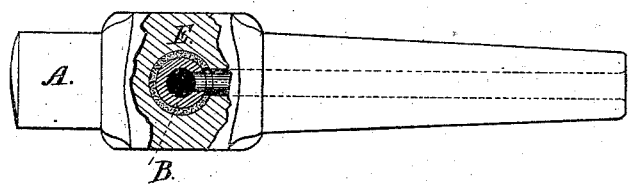

Figure 1 is a sectional elevation of our invention. Fig. 2 is a top view, partly in section, of the same, with detached portions hereinafter referred to.

A represents the body of an ordinary wooden tap; B, a non-corrosive metal plug; C, a cap, which is held to A by three screws, and forms a guard for retaining the plug B in position, and preventing the key turning more than is necessary. D is a key, which can only be passed through the cap C when turned so that the ward or slot in its side comes opposite to the conversely-formed lip $d$ on the inside of the cap C. The key D fits over the head of the plug B, upon the side of which is a lip, $e$, shaped to fit in the ward before referred to in the key D. The connection thus formed between the plug B and key D enables the latter to act upon the former, which may thus be turned on or off, as required; but the key D cannot be withdrawn except when the tap is turned off, as only at that time is the projection $e$ on a perpendicular line with the lip $d$, and the tap may be turned on or off in the darkness, for when turned full in either direction the projection $e$ butts against the lip $d$ of the cap, as may be understood by reference to drawing. E is the lining of cork, before referred to. The joint of the plug is made on this cork lining, which possesses such qualities that the joint will last longer, and the plug B will never get stuck or jammed.

Nothing new is claimed in the shape of the wooden tap A, or the manner in which the liquid passes through the plug B; but

What we claim as our invention, and desire to secure by Letters Patent, is—

A non-corrosive plug, B, having a projection, $e$, in combination with the cap C, having a lip, $d$, and a slotted key, D, substantially as and for the purposes set forth.

ERNST A. HORNBOSTEL.
EDWARD CARROLL.

Witnesses:
THOMAS EDE,
HUGH A. STEWART.